Nov. 21, 1972 B. H. READ ET AL 3,703,458

ELECTROLYTIC ETCH APPARATUS

Filed July 13, 1970 3 Sheets-Sheet 1

INVENTORS
Benjamin H. Read
Rexford E. Black
BY Flehr, Hohbach, Test, Albritton & Herbert
Attorneys INVENTORS
Benjamin H. Read
BY Rexford E. Black
Fleher, Hohbach, Test, Albritton & Herbert
Attorneys

ELECTROLYTIC ETCH APPARATUS

Filed July 13, 1970 3 Sheets-Sheet 3

INVENTORS
Benjamin H. Read
BY Rexford E. Black
Attorneys

United States Patent Office 3,703,458

Patented Nov. 21, 1972

3,703,458

ELECTROLYTIC ETCH APPARATUS

Benjamin Hays Read, San Jose, and Rexford E. Black, Sunnyvale, Calif., assignors to Signetics Corporation, Sunnyvale, Calif.

Filed July 13, 1970, Ser. No. 54,491
Int. Cl. B65g *49/00;* B23p *1/02*
U.S. Cl. 204—198 11 Claims

ABSTRACT OF THE DISCLOSURE

Electrolytic etch apparatus for processing articles having a layer of aluminum thereon comprising a tank adapted to carry an etch solution with an electrode assembly mounted in the tank and having first and second electrodes disposed in the etch solution. A boat assembly adapted to carry a plurality of the articles is disposed in the etch solution so that the articles are in contact with the etch solution. The boat assembly is provided with the means for making intimate electrical contact with each of the articles. The electrode assembly includes means for making contact between the boat assembly and one of the electrodes. A power supply is connected to the electrodes for causing a current to flow between the electrodes and through the etch solution. The electrode assembly also includes means for preventing the formation of a substantial number of bubbles in the vicinity of the articles so that bubbles will not occlude certain areas of the aluminum which are to be removed.

In the method, exposed aluminum carried by the articles is removed electrolytically until certain discontinuities occur in the aluminum, and thereafter the remaining aluminum is removed chemically.

BACKGROUND OF THE INVENTION

In the manufacture of semiconductor devices including integrated circuits, there has been a necessity for removing certain portions of aluminum film which has been deposited on the wafers from which these semiconductors were made. Photoresist has been utilized to protect the aluminum where it is not desired to remove the same. The exposed aluminum has typically been removed chemically such as by the use of sodium hydroxide. However, it has been found that there is a tendency for the sodium hydroxide to undercut the photoresist so that it has been difficult to precisely determine the areas of aluminum which will remain. There is, therefore, a need for a new and improved apparatus and method for removing aluminum from semiconductor wafers.

SUMMARY OF THE INVENTION AND OBJECTS

The electrolytic etch apparatus is for use for processing articles having a layer of aluminum thereon in which it is desired to remove certain portions which are not masked. The apparatus comprises a tank which is adapted to carry an etch solution and which serves as the electrolyte. An electrode assembly is mounted in the tank and is provided with first and second electrodes which are disposed in the solution. A boat assembly which is adapted to carry a plurality of the articles is disposed in the solution so that the articles are immersed in the etch solution. A boat assembly is provided with means for making intimate electrical contact with each of the articles. The electrode assembly includes means for making contact between the boat assembly and one of the electrodes. A power supply is connected to the electrodes for causing current to flow from one electrode to the other electrode. The electrode assembly also includes means for preventing the formation of a substantial number of bubbles which could possibly occlude certain portions of the aluminum which are to be etched away.

In the method, the apparatus is first operated with a forward bias so that the aluminum is removed electrolytically until discontinuities appear and, thereafter the apparatus is operated with a reverse bias so that the remaining aluminum which is exposed is removed chemically.

In general, it is an object of the present invention to provide an electrolytic etch apparatus and method which makes it possible to remove aluminum uniformly and without undercutting.

Another object of the invention is to provide an apparatus and method of the above character in which the aluminum can be removed relatively rapidly.

Another object of the invention is to provide an apparatus and method of the above character which is relatively simple.

Another object of the invention is to provide an apparatus of the above character which is relatively small and compact.

Another object of the invention is to provide an apparatus of the above character which can be utilized by relatively unskilled personnel.

Another object of the invention is to provide an apparatus and method of the above character which is particularly adapted for processing semiconductor wafers and removing aluminum therefrom.

DESCRIPTION OF THE PREFERRED EMBODIMENT

Figures 1, 2, 3:
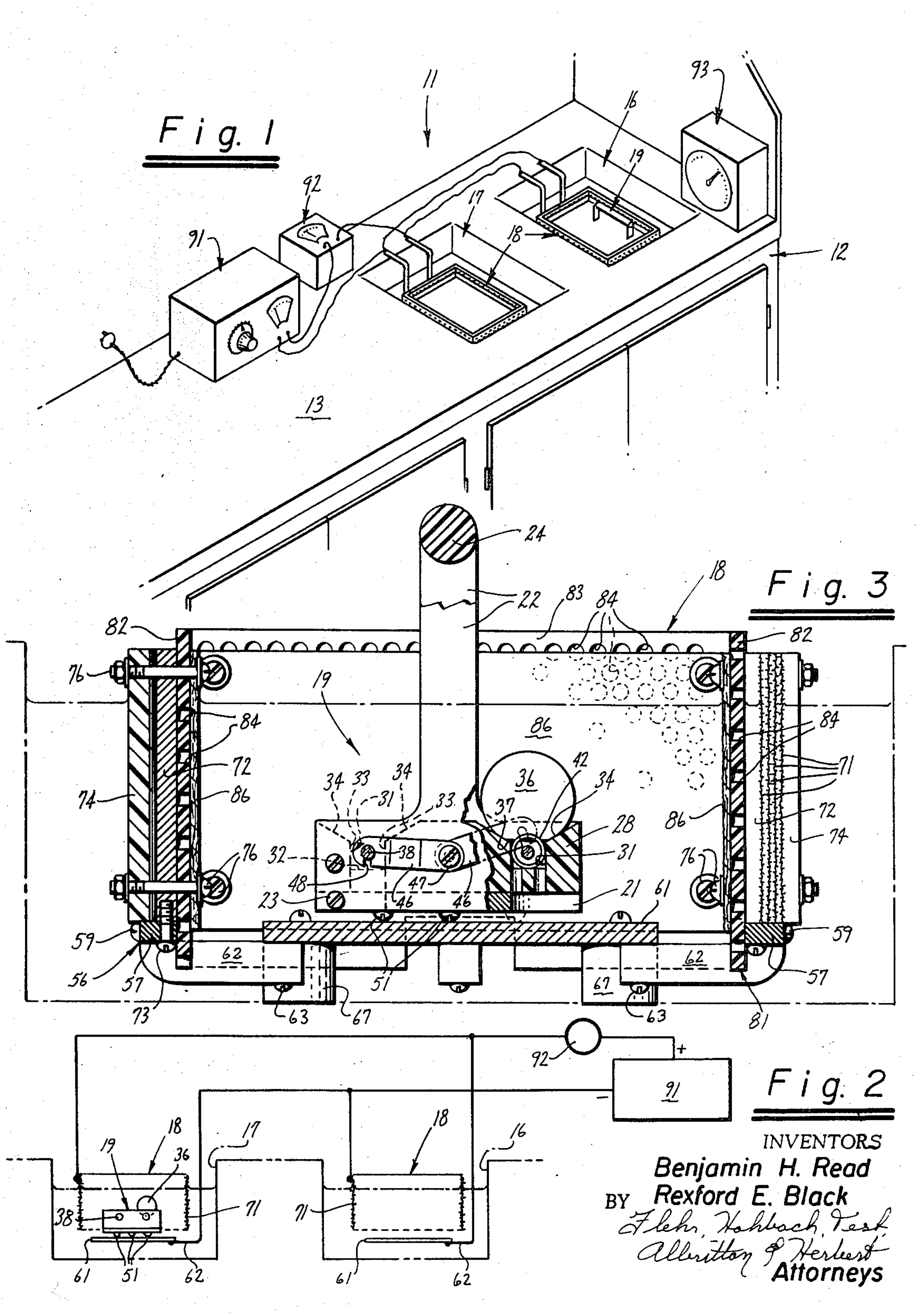
FIG. 1 is a perspective view of an electrolytic etch apparatus incorporating the present invention.
FIG. 2 is a circuit diagram in block form of the apparatus shown in FIG. 1.
FIG. 3 is a cross-sectional view taken along the line 3—3 of FIG. 1.

The electrolytic etch apparatus is shown in FIG. 1 and, as shown therein, consists of a sink 11 which is substantially conventional. It consists of a cabinet 12 which is provided with a counter 13 that lies in a horizontal plane. A pair of tanks or sinks 16 and 17 are set into one end of the counter 13. The tanks or sinks 16 and 17 are formed of a suitable plastic such as polypropylene. A tank electrode assembly 18 is provided in each of the tanks 16 and 17. A boat assembly 19 is mounted upon the tank electrode assembly 18 in the tank 16. The tank electrode assemblies 18 are connected into circuitry as shown in FIG. 2 and as hereinafter described.

Each boat assembly 19 consists of a base plate 21 formed of a suitable material such as stainless steel. For reasons hereinafter explained, it is desired that all the metal parts of the boat assembly be formed of the identical material as, for example, stainless steel and that stainless steel be of the same type as, for example, stainless steel in the 300 Series. A pair of end plates 22 formed of such stainless steel are secured to the base plate 21 by screws 23 also formed of stainless steel. A cylindrical handle 24 formed of a suitable material such as Teflon is mounted between the upper ends of the end plates 22 and is secured thereto by screws 26.

A base member 28 also formed of suitable material, such as Teflon, is mounted upon the base plate 21 between the end plates 22. The base member 28 is provided with a pair of spaced parallel grooves or recesses 31 which extend longitudinally of the base member between the end plates 22. As can be seen particularly from FIG. 3, the grooves are formed by a planar horizontal bottom wall 32, spaced parallel vertical side walls 33 which adjoin the bottom wall 32. The vertical side walls 33 adjoin inclined side walls 34 which are inclined upwardly and outwardly with respect to the side walls 33. The base member 28 is provided with a plurality of elongate drain holes 35 extending upwardly through the base member and which open through the bottom wall 32 of the recesses or grooves 31.

The boat assembly 19 is adapted to carry a plurality of wafers 36 for processing in the electrolytic etch apparatus. The wafers 36 are of a conventional type and typically can be semiconductor wafers formed of silicon which are generally circular in shape as shown in FIG. 3 and having a diameter ranging from 1½ inches to 2 inches and up. Such wafers 36 are provided with flats 37 which are used for registration purposes.

The boat assembly 19 is provided with means for carrying a plurailty of the wafers 36 in each of the grooves 31. Such means takes the form of a metal rod 38 formed of stainless steel which is slidably mounted in holes 39 provided in the end plates 22. The holes 39 are positioned in such a manner that the rods 38 pass through the grooves 31 and are generally centrally disposed between the side walls 33 and adjacent the bottom wall 32. The rods 38 have a length which is substantially greater than the length of the base plate 21 so that they extend beyond the end plates 22. A knob 41 is provided on one end of each of the rods 38 and is provided to facilitate movement of the rod by hand as hereinafter described.

Figure 4:
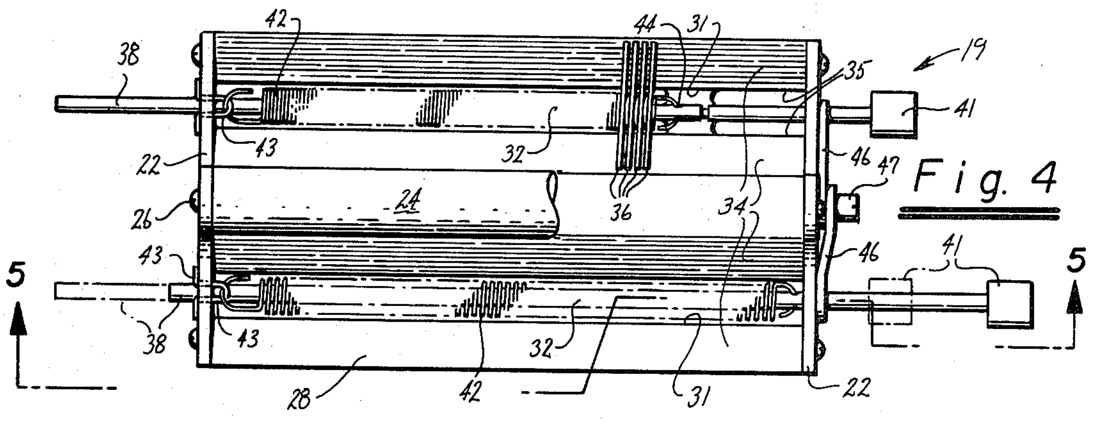
FIG. 4 is a top plan view of the boat assembly utilized as a part of the electrolytic etch apparatus.

A coil spring 42 formed of a suitable material such as stainless steel is mounted on each of the rods 38 in such a manner that the rods 38 extend through the springs. One end of each of the springs is secured to a clip 43 which extends through the adjacent end plate 22 and has its ends bent over so that it is secured thereto as shown particularly in FIG. 4. The other end of the spring extends through a hole 44 provided in the associated rod 38. The rods 38 are positioned in the grooves 31 in such a manner and the relationship of the size of the coil springs 42 and the rods 38 is such that the coil springs are in very close proximity and, in fact, can rest upon the bottom walls 32. It will be noted that the diameter of the rod 38 is substantially less than the inner diameter of the coil spring 42. For example, the rod can have a diameter of ¼ of an inch, whereas the spring 42 can have an inside diameter of ¾ inch. As hereinafter described, it is desirable that the rod 38 be disposed relatively close to the bottom of the spring so that the spring can make intimate contact with the rod when the wafers 36 are inserted into the spring.

The knob 41 carried by each of the rods 38 can be grasped by hand and can be pulled away from the end plate to stretch the coil spring 42 mounted thereon. Means is provided for retaining the rod in a position in which the coil spring will be stretched so that wafers 36 can be readily mounted between the coils of the coil spring. Such means consists of latches 46 which are pivotally mounted upon a cap screw 47 threaded into one of the end plates 22. Each latch 46 is provided with a slot 48 to permit the latch to seat in an annular groove 49 provided in the associated rod 38. Thus, it can be seen that when a rod 38 is retracted to stretch spring 42 mounted thereon that the latch 46 will drop by force of gravity into the groove 49 as soon as the groove 49 clears the outer surface of the end plate 22.

Three screws 51 are mounted in the bottom side of the base plate 21 with one of the screws being adjacent one end and two of the screws being adjacent the other end of the base plate.

It should be appreciated that the materials which are utilized in the boat assembly must be of a type which can withstand the solutions which are to be used during the etching operation as hereinafter described. For example, both the plastic and the metal which are utilized should be able to withstand a phosphoric acid solution. In addition, the boat assembly should be constructed of materials which will give it enough weight so that it will remain immersed in the etch solution.

Figures 7, 8:
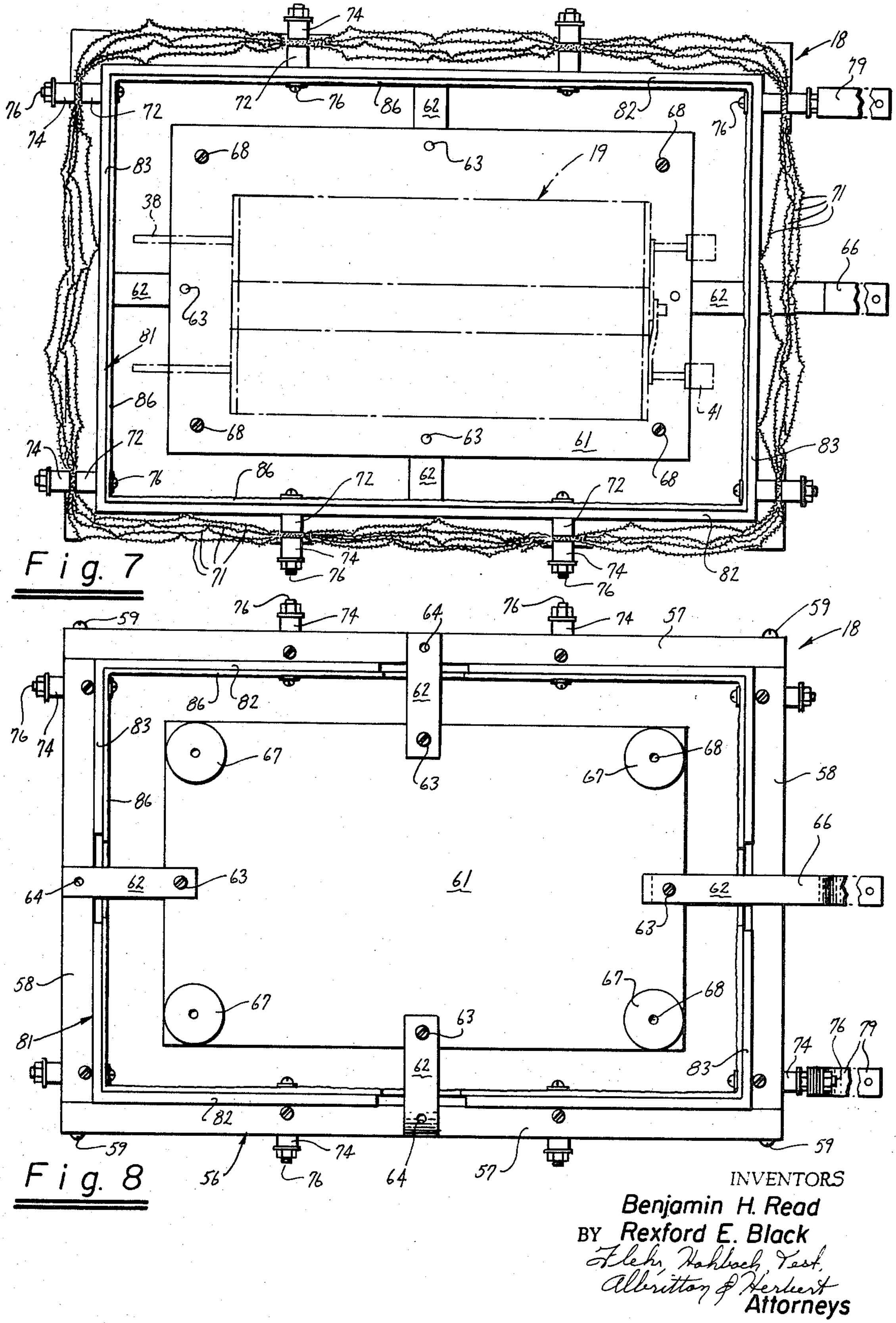
FIG. 7 is a top plan view of the tank electrode assembly utilized as a part of the electrolytic etch apparatus.
FIG. 8 is a bottom plan view of the tank electrode assembly.

The tank electrode assembly 18 consists of a rectangular framework 56 formed of a suitable material such as stainless steel. As can be seen particularly in FIG. 8, the framework 56 consists of a pair of side members 57 and a pair of end members 58 which are fastened together in a suitable manner such as by screws 59. A bottom plate 61 formed of a suitable material such as stainless steel serves as a first electrode and is carried by the framework 56 but is electrically insulated therefrom. Four support members 62 formed of a suitable insulating material such as Teflon are provided for this purpose. The support members 62 are secured to the bottom plate 61 by screws 63 and are secured to the framework 56 by screws (not shown) threaded into holes 64 provided in the support member 62. Straps 66 formed of a suitable material such as stainless steel are secured to one of the screws 63 and are utilized for making electrical contact to the bottom plate 61. Support posts 67 formed of suitable insulating material such as Teflon are mounted on the four corners of the bottom plate 61 and are secured to the bottom plate 61 by screws 68.

The other or second electrode of the tank electrode assembly 18 is formed by four layers of a fine stainless steel screen 71 which is mounted in a generally vertical position or at right angles to the framework 56. The mounting means takes the form of a plurality of posts 72 formed of stainless steel which is secured to the framework 56 by screws 73. As can be seen, two of the posts 72 are provided on each of the side and end members 57 and 58 of the framework 56. The four layers of screen 71 are clamped to the posts 72 by bars 74 formed of an insulating material such as Teflon which are clamped to the posts 72 by bolts 76. A plurality of straps 79 are secured to one of the bolts 76 for making electrical contact to the screen 71.

A rectangular filter support 81 is provided within the screen 71. The filter support is formed by a pair of spaced parallel side walls 82 and a pair of spaced parallel end walls 83 which are bonded together in a suitable manner so as to form the rectangular filter support 81. The walls 82 and 83 are formed of a suitable material such as polypropylene which has been provided with a plurality of holes 84 so that, in effect, the entire filter support is perforated. The filter support 81 is secured to certain of the posts 72 by the bolts 76. A fine filter 86 having very small passages therein is mounted upon the filter support 81 and serves as a bubble baffle as hereinafter described. The filter 86 can be formed of any suitable material such as fiber glass. One filter found to be particularly suitable is Millipore Filter AP20. The filter 86 can be mounted upon the filter support 81 in any suitable manner. For example, a fiber glass of the type hereinbefore described can be bonded to the filter support 81 by heat sealing it to the filter support. In order to obtain optimum operation of the electrolytic etch apparatus, it is desirable that the filter support be perforated in such a manner that it have at least 30% open area so that electron flow is not restricted.

As can be seen from FIG. 1, one of the tank electrode assemblies 18 is disposed in each of the tanks 16 and 17. Both of the tank electrode assemblies 18 are connected to a suitable source of power as, for example, a power supply 91 through an ammeter 92 in such a manner that the tank electrode assembly in the tank 16 can have a forward bias placed thereon and the tank electrode assembly in the tank 17 can have a reverse bias placed thereon. The power supply 91 and the ammeter 92 rest on the counter 13. In addition, there is provided a timer 93 which can be utilized for timing the etching operations.

It should be appreciated that, if desired, different types of materials can be utilized for the electrolytic etch apparatus other than those described. For example, in place of stainless steel, a gold or a gold-plated construction can be provided if the surfaces of other metals are not exposed. It is also possible that metals such as platinum and nickel can be utilized in such etching apparatus. Insulating materials other than those described can be utilized. It is only necessary that they not react with the solutions which are used in conjunction with the etch apparatus.

Operation and use of the electrolytic etch apparatus in performing the present method may now be briefly described as follows. Let it be assumed that a plurality of the wafers 36 are to be processed in the electrolytic etch apparatus. Typically, such wafers would be formed of silicon and would have the active and passive devices formed therein by diffused regions and with metallization in the form of aluminum deposited on the wafers and making contact to the diffused regions in the wafer through openings formed in a silicon dioxide insulating layer. The aluminum generally is deposited over the entire surface of the wafer and is then covered with a conventional photoresist which is then exposed to ultraviolet light through a mask which is often called the metal fifth mask. The photoresist is then developed in a conventional manner and the unexposed photoresist is removed so that some of the aluminum which has been deposited on the wafer is protected and other portions of the aluminum are exposed through the photoresist. It is then desirable to remove this aluminum which has been exposed through the photoresist by the present electrolytic etch apparatus utilizing the present method.

Figures 5, 6:
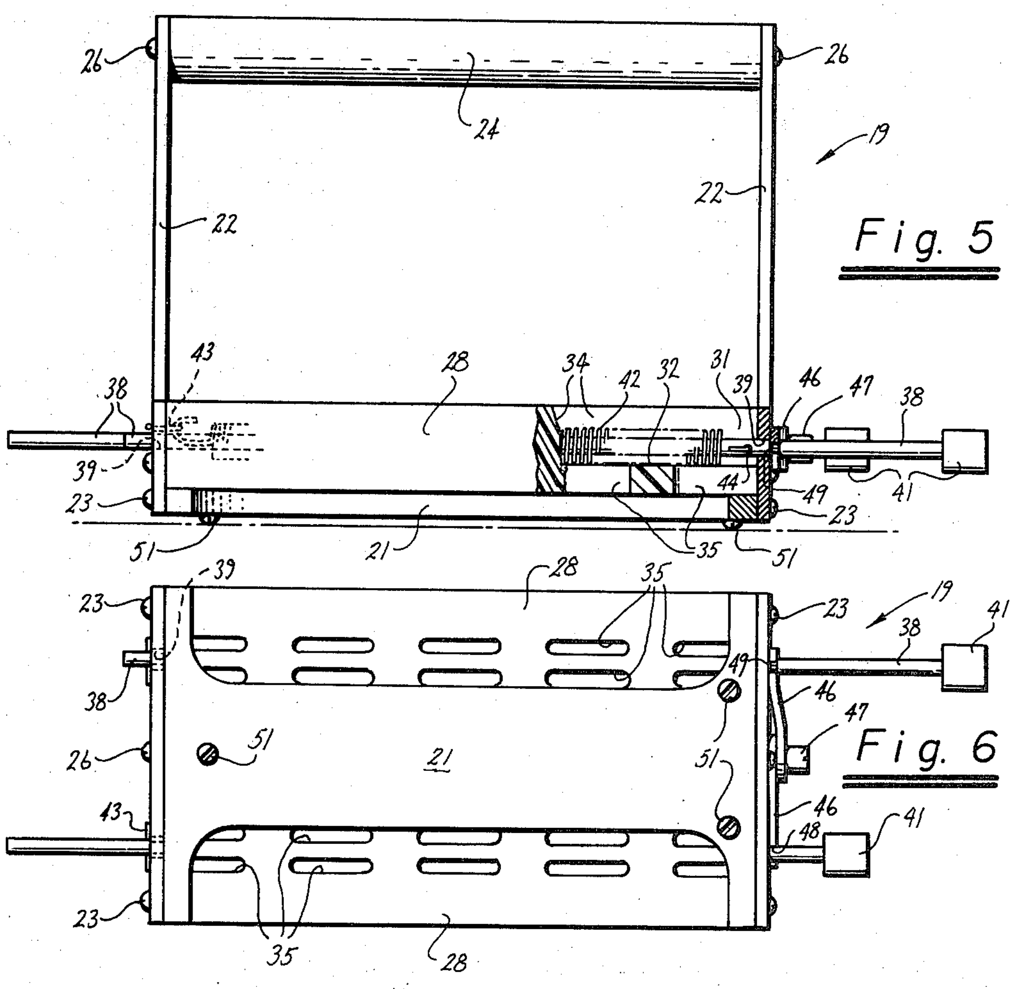
FIG. 5 is a side elevational view, partly in cross-section, looking along the line 5—5 of FIG. 4.
FIG. 6 is a bottom plan view of the boat assembly.

The wafers 36 in this condition are loaded into the boat assemblies 19. In loading each of the boat assemblies 19, the knobs 41 are grasped and the rods 38 are retracted until the latches 46 drop into the grooves 49 provided in the rods 38. When the rods are in these positions, the coil springs 42 are stretched so that there is a substantial space between each of the turns of the spring as is shown particularly in FIG. 5. The wafers 36 are then positioned by hand or any other suitable manner in the spaces provided between turns of the helical coil springs 42 in such a manner that the flats 37 face upwardly and so that the wafers rest upon the inclined side walls 34 of the grooves 31. In this manner, the wafers can be loaded into the boat assembly by placing one of the wafers between each of the spaced turns so that the wafers are generally vertically disposed and are spaced longitudinally of the recess or grooves 31. By way of example, one wafer can be mounted between each third turn of the spring so that twenty wafers or more can be mounted in each of the grooves 31 provided in the boat assembly 19. After the wafers have been loaded into the boat, the knob 41 is again grasped and the latch 46 is removed and the rod 38 is gradually permitted to move inwardly under the force of the spring 42 so that the turns of the spring will close upon the wafers 36 mounted therein and to thereby frictionally engage the wafers. Since the wafers 36 are mounted in the top of the spring, upon closing of the spring there will be a tendency for the spring to bow upwardly to cause the lower portion of the spring to come into intimate contact with the rod 38 so as to make a close contact between the rod and the spring and at the same time, the spring by frictionally engaging the wafers makes close contact with both sides of the wafer. In this way, it can be seen that approximately 40 wafers can be loaded into each of the boat assemblies 19.

After the boat assemblies have been loaded with the wafers, the power supply 91 is checked to ascertain that it is set at the proper voltage ranging from approximately .7 to 2.0 volts D.C. The tank electrode assemblies 18 are disposed within the tanks 16 and 17 which are filled to a suitable level with the etch solution as, for example, a solution containing 8.50% phosphoric acid which also serves as the electrolyte. By way of example, it has been found that it is desirable to set the voltage at approximately 1.45 volts to obtain the desired current flow in such an electrolyte.

It has been found that if a substantially higher voltage is used, the constituents of the stainless steel may go into the etching solution and contaminate the solution and, in fact, may actually plate out in certain situations.

After the voltage has been checked, the boat assembly 19 carrying the wafers which are to be etched is rapidly lowered into the tank electrode assembly 18 so that the screws 51 in the base plate 21 of the boat rests upon the stainless steel electrode 61 of the tank electrode assembly. Since the tank electrode assembly 18 in the tank 16 is forward biased, the electrode 61 will carry a positive potential.

As soon as the boat assembly 19 is lowered onto the tank electrode assembly 18, current will begin to flow from the electrode 61 through the base plate 21 through the end plates 22, then through the rods 38, the springs 42, through the back sides of the wafers and through the aluminum which is carried by the wafers and through the etch solution contained within the tank which also serves as an electrolyte to the other or screen electrode 71 to the other side of the power supply. The aluminum which is exposed to the etching solution is rapidly removed so that the only aluminum which remains on the wafer is that which is masked by the photoresist. It has been found that approximately 1000 angstroms of aluminum can be removed for each minute that the boat assembly is in the etching solution. By way of example, if aluminum is being etched which has a thickness of approximately 10,000 angstroms, there will be a relatively steady current flow for the first nine minutes that the boat assembly is in the etch solution but that thereafter there is a very rapid drop-off in the current flow indicating that the aluminum film which is being etched is rapidly becoming discontinuous.

In order to prevent undercutting of the aluminum, it has been found it is desirable to terminate the current flow in the forwardly biased tank when the current flow has dropped a predetermined amount as, for example, when the current drops from ⅓ to ½ of the original current level. In the apparatus, this point is ascertained automatically. The ammeter 92 is provided with automatic means for indicating when the current level drops such a predetermined amount. This is accomplished by adjusting the ammeter for the current level which flows shortly after the boat assembly is placed in the etch solution. An indicator is thereafter set between the ⅓ and ½ of this initial reading so that when the current flow drops to this value, a buzzer provided with the ammeter will sound to indicate to the operator that the etching operation has almost been completed and that it is desirable to remove the boat assembly from the etching solution.

At this time, the boat assembly is removed from the tank 16 and the etch solution is permitted to drain through the openings 35 in the bottom of the boat assembly.

The boat assembly is then placed in the other tank 17 in which the electrode assembly has a reverse bias thereon to prevent further removal of aluminum by electrolytic action. In the tank 17 the aluminum is removed solely by chemical etching. The aluminum which is exposed at this stage is relatively powdery and is discontinuous. It has been found that it takes approximately from 6 to 10 minutes in the reverse bias tank 17 to assure complete removal of any aluminum existing which is not covered by photoresist.

After the boat assembly 19 has remained in the tank 17 for a sufficient period of time, the boat assembly again is removed and the phosphoric acid permitted to drain therefrom through the holes 35. The wafers in the boat are then rinsed in a suitable manner such as by deionized water and are then transferred to another container and rinsed again because it is possible that the spring may retain some of the phosphoric acid between it and the wafers.

After the wafers have been cleaned, the photoresist remaining can be removed in a conventional manner and thereafter, the wafers can be processed with conventional steps to provide the desired semiconductor devices.

It has been found that the foregoing apparatus and method have many advantages. It makes it possible to have a very uniform and excellent job of removing the aluminum from the desired locations on the wafer. There is no undercutting of the aluminum, nor is there any aluminum remaining in undesired locations. By the use of the filter, there is no formation of bubbles on the wafers which could retard or impede contact of the etch solution with the aluminum or occlude the aluminum which is to be etched away. There is excellent contact between the wafers and the boat assembly so that the wafers are etched uniformly in the etch solution. In other words, the filter prevents the bubbles from travelling from screen 71 to the wafers.

The apparatus is relatively temperature insensitive. In other words, it can operate at various temperatures. It can be appreciated that the etching will occur at a faster rate at higher temperatures but the apparatus, as constructed, will sense when the current drops to one-half of its level. This will indicate that it is desirable to remove the boat assembly from the tank with a forward bias and insert it in the tank with reverse bias.

What is claimed is:

1. An electrolytic etch apparatus for processing disc-like articles having an aluminum layer thereon with certain portions of the aluminum being masked and other portions of the aluminum being exposed, a tank adapted to carry an etch solution suitable for etching aluminum, an electrode assembly mounted in the tank having first and second electrodes disposed in the etch solution, a power supply connected to said first and second electrodes for causing current to flow between said first and second electrodes and a boat assembly adapted to carry a plurality of the disc-like articles disposed in the etch solution so that the articles are immersed in the etch solution, said boat assembly including means for making intimate electrical contact with each of the disc-like articles, said electrode assembly including means for making electrical contact between the boat assembly and one of the electrodes, said electrode assembly also including filter means disposed between one of the electrodes and the articles for inhibiting bubbles formed at said one electrode from moving into contact with the articles.

2. Apparatus as in claim 1 wherein said electrode assembly is readily removable from the tank and includes a framework, a metal plate mounted on said framework, a screen mounted on said framework and surrounding an area overlying said plate, said plate serving as one of said electrodes and said screen serving as the other of said electrodes and wherein said boat assembly is adapted to rest on said plate so that the articles carried by the boat assembly are surrounded by the screen, said screen and said plate being electrically insulated from each other.

3. Apparatus as in claim 2 wherein said filter means is carried by the framework and is disposed between the screen and the plate to inhibit the travel of bubbles from the screen to the plate and to thereby prevent any substantial number of bubbles from coming into contact with the articles carried by the boat assembly.

4. An electrolytic etch apparatus for processing articles having an aluminum layer thereon with certain portions of the aluminum being masked and other portions of the aluminum being exposed, a tank adapted to carry an etch solution, an electrode assembly mounted in the tank having first and second electrodes disposed in the etch solution, a power supply connected to said first and second electrodes for causing current to flow between said first and second electrodes and a boat assembly adapted to carry a plurality of the articles disposed in the etch solution so that the articles are immersed in the etch solution, said boat assembly including means for making intimate electrical contact with each of the articles, said electrode assembly including means for making electrical contact between the boat assembly and one of the electrodes, said electrode assembly also including filter means for preventing the formation of a substantial number of bubbles in the vicinity of the articles which could prevent the etch solution from making contact with the exposed aluminum of the articles, said filter means including a perforated plastic member and a filter having relatively small openings therein carried by the plastic member.

5. An electrolytic etch apparatus for processing articles having an aluminum layer thereon with certain portions of the aluminum being masked and other portions of the aluminum being exposed, a tank adapted to carry an etch solution, an electrode assembly mounted in the tank having first and second electrodes disposed in the etch solution, a power supply connected to said first and second electrodes for causing current to flow between said first and second electrodes and a boat assembly adapted to carry a plurality of the articles disposed in the etch solution so that the articles are immersed in the etch solution, said boat assembly including means for making intimate electrical contact with each of the articles, said electrode assembly including means for making electrical contact between the boat assembly and one of the electrodes, said electrode assembly also including filter means for preventing the formation of a substantial number of bubbles in the vicinity of the articles which could prevent the etch solution from making contact with the exposed aluminum of the articles, said electrode assembly including a framework, a metal plate mounted on said framework, a screen mounted on said framework and surrounding an area overlying said plate, said plate serving as one of said electrodes and said screen serving as the other of said electrodes, said boat assembly being adapted to rest on said plate so that the articles carried by the boat assembly are surrounded by the screen, said screen and said plate being electrically insulated from each other, said metal plate being formed of stainless steel.

6. An electrolytic etch apparatus for processing articles having an aluminum layer thereon with certain portions of the aluminum being masked and other portions of the aluminum being exposed, a tank adapted to carry an etch solution, an electrode assembly mounted in the tank having first and second electrodes disposed in the etch solution, a power supply connected to said first and second electrodes for causing current to flow between said first and second electrodes and a boat assembly adapted to carry a plurality of the articles disposed in the etch solution so that the articles are immersed in the etch solution, said boat assembly including means for making intimate electrical contact with each of the articles, said electrode assembly including means for making electrical contact between the boat assembly and one of the electrodes, said electrode assembly also including filter means for preventing the formation of a substantial number of bubbles in the vicinity of the articles which could prevent the etch solution from making contact with the exposed aluminum of the articles.

7. Apparatus as in claim 6 wherein said rod is disposed adjacent the lower portion of the spring whereby when the wafers are disposed between the turns the lower portion of the spring will be bowed upwardly into contact with the rod.

8. Apparatus as in claim 6 wherein said base member includes means for making electrical contact with one of the electrodes.

9. An electrolytic etch apparatus for processing articles having an aluminum layer thereon with certain portions of the aluminum being masked and other portions of the aluminum being exposed, a tank adapted to carry an etch solution, an electrode assembly mounted in the tank having first and second electrodes disposed in the etch solution, a power supply connected to said first and second electrodes for causing current to flow between said first and second electrodes and a boat assembly adapted to carry a plurality of the articles disposed in the etch solution so that the articles are immersed in the etch solution, said boat assembly including means for making intimate electrical contact with each of the articles, said electrode assembly including means for making electrical contact between the boat assembly and one of the electrodes, said electrode assembly also including filter means for preventing the formation of a substantial number of bubbles in the vicinity of the articles which could prevent the etch solution from making contact with the exposed aluminum of the articles, said electrode assembly including a framework and a metal plate mounted on said framework, a screen mounted on said framework and surrounding an area overlying said plate, said plate serving as one of said electrodes and said screen serving as the other of said electrodes, said boat assembly being adapted to rest on said plate so that the articles carried by the boat assembly are surrounded by the screen, said screen and said plate being electrically insulated from each other, said boat being adapted to rest upon said plate, said boat assembly being provided with means for establishing electrical contact between the plate and the rod and the spring mounted thereon.

10. Apparatus as in claim 7 wherein said boat assembly includes means for retaining said rod in a retracted position to facilitate loading of the wafers between the turns of the spring.

11. In an electrolytic etch apparatus for processing articles having an aluminum layer thereon with certain portions of the aluminum being masked and other portions of the aluminum being exposed, a tank adapted to carry an etch solution formed primarily of phosphoric acid, an electrode assembly mounted in the tank having first and second electrodes disposed in the etch solution, a power supply connected to said first and second electrodes for causing current to flow between said first and second electrodes and a boat assembly adapted to carry a plurality of the articles disposed in the etch solution so that the articles are immersed in the etch solution, said boat assembly including means for making intimate electrical contact with each of the articles, said electrode assembly including means for making electrical contact between the boat assembly and one of the electrodes, said electrode assembly also including filter means for preventing the formation of a substantial number of bubbles in the vicinity of the articles which could prevent the etch solution from making contact with the exposed aluminum of the articles.

References Cited

UNITED STATES PATENTS

| | | | |
|---|---|---|---|
| 3,275,542 | 9/1966 | Couture. | |
| 2,771,415 | 11/1956 | Ross | 204—238 |
| 3,035,999 | 5/1962 | Sharon et al. | 204—297 R |
| 3,457,151 | 7/1969 | Kortejarvi | 204—285 X |
| 2,517,907 | 8/1950 | Mikulas | 204—297 R X |

FOREIGN PATENTS

| | | | |
|---|---|---|---|
| 449,289 | 6/1936 | Great Britain | 204—297 R |

JOHN H. MACK, Primary Examiner

D. R. VALENTINE, Assistant Examiner

U.S. Cl. X.R.

204—224, 252, 283, 287